(12) United States Patent
Higuchi

(10) Patent No.: US 6,690,877 B1
(45) Date of Patent: Feb. 10, 2004

(54) MAGNETIC TAPE RECORDING APPARATUS

(75) Inventor: Yoshio Higuchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/505,856

(22) Filed: Feb. 17, 2000

(30) Foreign Application Priority Data

Feb. 18, 1999 (JP) ..................................... U. 11-000731

(51) Int. Cl.$^7$ .............................. H04N 9/80; H04N 9/79
(52) U.S. Cl. ............................. 386/24; 386/26; 386/28
(58) Field of Search .......................... 386/1, 13, 17, 386/22, 26, 28, 24

(56) References Cited

U.S. PATENT DOCUMENTS 5,153,741 A * 10/1992 Matsuo et al. ................. 386/24

FOREIGN PATENT DOCUMENTS

| GB | 2040135 A | * | 8/1980 |
|---|---|---|---|
| JP | 51-91621 | | 8/1976 |
| JP | 51-109732 | | 9/1976 |
| JP | 52-138822 | | 11/1977 |
| JP | 58-90889 | | 5/1983 |
| JP | 63-308492 | | 12/1988 |
| JP | 5-207512 | | 8/1993 |
| JP | 5-207513 | | 8/1993 |

\* cited by examiner

Primary Examiner—Huy Nguyen
(74) Attorney, Agent, or Firm—Crowell & Moring LLP

(57) ABSTRACT

In a magnetic tape recording apparatus for recording an FM luminance signal and a low frequency converted chrominance onto tracks of a magnetic tape, both of a frequency of the FM luminance signal and a spectrum distribution of the low frequency converted chrominance are shifted by $f_H/2$ between two of the tracks corresponding to the first field and the second field of one frame of a recorded image when a horizontal scanning frequency is presumed as $f_H$. The frequency of the FM luminance signal is shifted by $f_w/4$ between two of the tracks corresponding to the second field of one frame and the first field of the subsequent frame.

8 Claims, 5 Drawing Sheets

MAGNETIC TAPE RECORDING APPARATUS

BACKGROUND OF THE INVENTION

The present invention relates to a magnetic tape recording apparatus for recording a low frequency converted chrominance, and relates more specifically to a magnetic recording apparatus that facilitates the interleaving of a low frequency converted chrominance and an FM luminance signal by performing a frequency shift for the FM luminance signal.

Generally, a magnetic recording apparatus for the recording of video signals on magnetic tape can perform two types of recording: standard mode recording, and extended time mode recording. For a recording performed in the standard mode, the frequency of an FM luminance signal is not shifted at adjacent tracks. For a recording performed in the extended time mode, however, since the inter-track intervals are narrow and as a result increased crosstalk is generated between tracks, to prevent the image quality deterioration that thereby results, each time a track change occurs there is an $f_H/2$ shift in the frequency of the FM luminance signal ($f_H$ denotes a horizontal scanning frequency), a process that produces a visual reduction in the deterioration of image quality due to crosstalk (this is defined as the first related art).

Another related art example is proposed in Japanese Patent Publication No. 63-308492A. According to this example of the related art, a single delay circuit is used in common by a Y/C separator, a drop out compensator, and a feedback H-correlated noise canceling circuit. Therefore, both the number of required parts and the number of the places adjustments must be made are reduced (this is defined as the second related art).

When the first related art is employed, it is accompanied by the following problem. To improve the resolution of a video signal recorded on magnetic tape, the characteristic of a high-pass filter, for removing from an FM luminance signal a signal component that overlaps a low frequency converted chrominance, is set so that on the low frequency side the value of the attenuation is also low. And when the characteristic of the high-pass filter is set so that on the low frequency side the value of attenuation is low, it is difficult to obtain a satisfactory attenuation value relative to the signal component whose frequency band overlaps the low frequency converted chrominance. As a result, the signal component of the FM luminance signal is mixed with the low frequency converted chrominance.

Further, a crystal oscillator is employed to establish a frequency of a carrier wave for a low frequency converted chrominance, and accordingly, the precision of the frequency at which the spectrum of a low frequency converted chrominance is distributed is increased. However, the frequency of the FM luminance signal fluctuates due to a shift in the value of an oscillator (a resistor or a capacitor) or a change in the level of the FM luminance signal. Therefore, an interleave relationship may be established between the spectra of the FM luminance signal and the low frequency converted chrominance, or a relationship may be established wherein these spectra overlap with each other. When the latter relationship is established, the spectrum of the FM luminance signal adversely affects the low frequency converted chrominance. And as a result, interference between the FM luminance signal and the chrominance occurs at the edge of an image, and the image quality is deteriorated.

In the second related art, the delay circuit is used in common. Therefore, even when this technique is employed, the problem encountered with the first related art is not resolved. And when the resolution of a video signal to be recorded is increased, image quality is deteriorated due to the mixing of the FM luminance signal with the low frequency converted chrominance.

SUMMARY OF THE INVENTION

It is therefore a first object of the present invention is to provide a magnetic tape recording apparatus which is able to reduce deterioration of the image quality, which is caused by the mixing of an FM luminance signal with a low frequency converted chrominance, even when the resolution of a video signal to be recorded is increased, without providing a complex structured frequency shifting unit for shifting the FM luminance signal.

In order to achieve the above object, there is provided a magnetic tape recording apparatus for recording an FM luminance signal and a low frequency converted chrominance onto tracks of a magnetic tape, wherein both of a frequency of the FM luminance signal and a spectrum distribution of the low frequency converted chrominance are shifted by $f_H/2$ between two of the tracks corresponding to the first field and the second field of one frame of a recorded image when a horizontal scanning frequency is presumed as $f_H$, comprising a frequency shifter for shifting the frequency of the FM luminance signal by $f_H/4$ between two of the tracks corresponding to the second field of one frame and the first field of the subsequent frame.

The present invention may be represented as a method of recording an FM luminance signal and a low frequency converted chrominance onto tracks of a magnetic tape, comprising the steps of:

shifting both of a frequency of the FM luminance signal and a spectrum distribution of the low frequency converted chrominance by $f_H/2$ between two of the tracks corresponding to the first field and the second field of one frame of a recorded image when a horizontal scanning frequency is presumed as $f_H$, and shifting the frequency of the FM luminance signal by $f_H/4$ between two of the tracks corresponding to the second field of one frame and the first field of the subsequent frame.

Specifically, while the spectra of the low frequency converted chrominance and the FM luminance signal overlap in the frame wherein there is no $f_H/4$ shift in the frequency of the FM luminance signal, in the frame wherein there is an $f_H/4$ shift in the frequency of the FM luminance signal the interleaving relationship is established for these spectra. Therefore, the interleaving is established for one frame, regardless of the value of a change in the frequency of the FM luminance signal. Accordingly, even when the resolution of a video signal to be recorded is increased, deterioration of the image quality, which occurs when an FM luminance signal is mixed with a low frequency converted chrominance, is reduced.

According to the present invention, there is also provided a magnetic tape recording apparatus for recording an FM luminance signal and a low frequency converted chrominance onto tracks of a magnetic tape, wherein a spectrum distribution of the low frequency converted chrominance is shifted by $f_H/2$ between two of the tracks corresponding to the first field and the second field of one frame of a recorded image when a horizontal scanning frequency is presumed as $f_H$, comprising a frequency shifter for shifting the frequency of the FM luminance signal by $f_H/8$ between two of the tracks corresponding to the second field of one frame and the first field of the subsequent frame.

The above invention may be represented as a method of recording an FM luminance signal and a low frequency converted chrominance onto tracks of a magnetic tape, comprising the steps of:

shifting a spectrum distribution of the low frequency converted chrominance by $f_H/2$ between two of the tracks corresponding to the first field and the second field of one frame of a recorded image when a horizontal scanning frequency is presumed as $f_H$, and shifting a frequency of the FM luminance signal by $f_H/8$ between two of the tracks corresponding to the second field of one frame and the first field of the subsequent frame.

Specifically, while fields wherein the spectra of the low frequency converted chrominance and the FM luminance signal overlap are generated in a frame wherein there is no $f_H/8$ shift in the frequency of the FM luminance, in a frame wherein for these spectra there is an $f_H/8$ shift in the frequency of the FM luminance signal, the interleaving relationship is established in the two fields. Therefore, even when the resolution of a video signal to be recorded is increased, deterioration of the image quality, which occurs when the FM luminance signal is mixed with a low frequency converted chrominance, is reduced.

Preferably, the frequency shifter includes a frequency divider for frequency half-dividing a frequency of a head switching signal for changing connection between rotary heads, and the frequency shift of the FM luminance signal is conducted by use of the frequency-divided signal of the head switching signal.

That is, the output of the frequency divider for frequency half-dividing, the frequency of the head switching signal is the output whose level is changed each time the frame is altered. Therefore, when the level of the output of the frequency divider goes to either H or L, only the frequency of the FM luminance signal need be shifted. Therefore, a frequency shifting unit that is provided for shifting the frequency of an FM luminance signal will not have a complex structure.

DETAILED DESCRIPTION OF THE PREFERRED EMBODIMENTS

Figure 1:
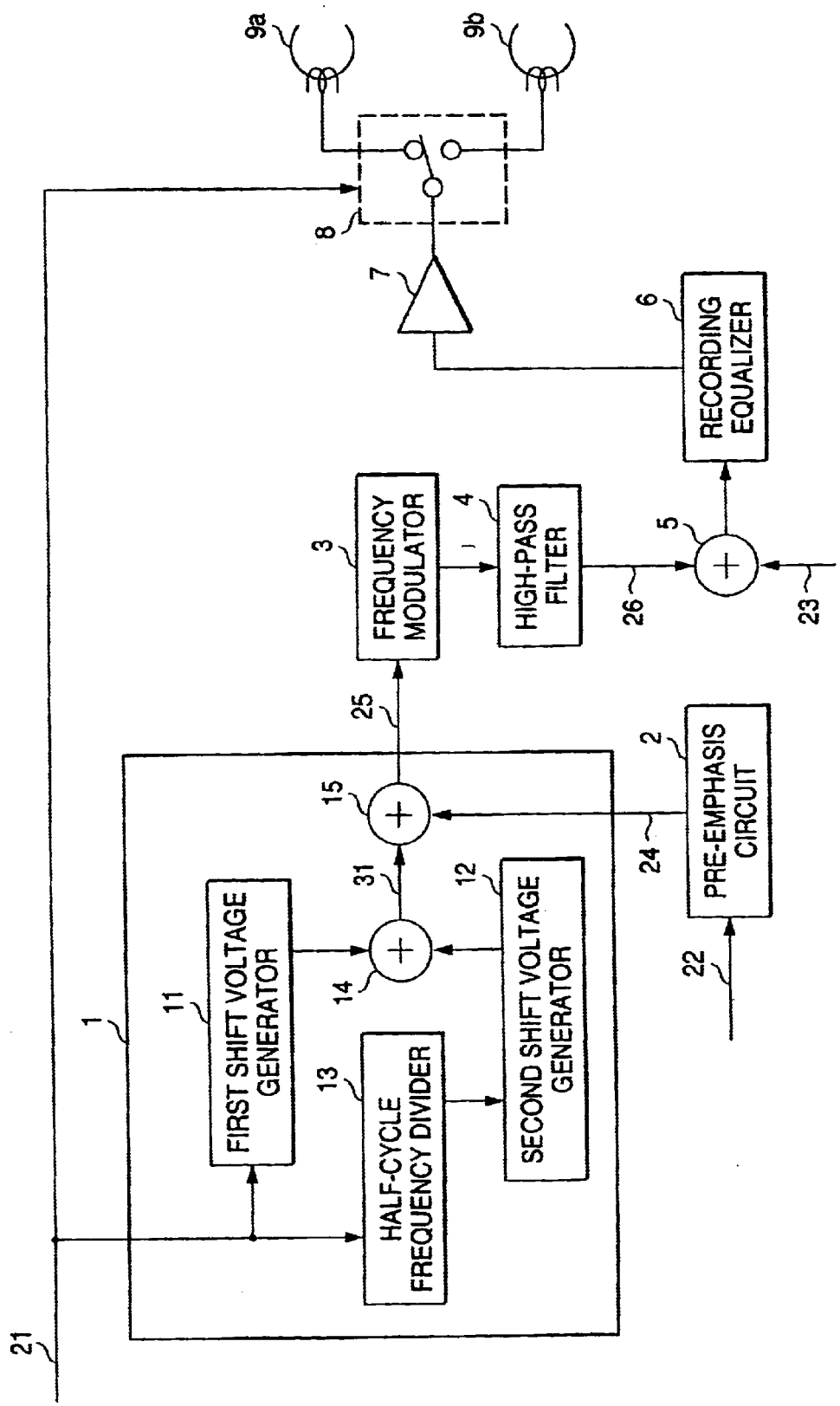
FIG. 1 is a block diagram illustrating the electrical arrangement of a magnetic tape recording apparatus according to a first embodiment of the invention.

The preferred embodiments of the invention will now be described while referring to the drawings.

FIG. 1 is a block diagram illustrating the electrical arrangement of a magnetic tape recording apparatus according to a first embodiment of the invention, and specifically showing an apparatus for recording an NTSC video signal.

In FIG. 1, a pre-emphasis circuit 2 is a block for increasing the level of the high frequency component of a luminance signal 22. The pre-emphasis circuit 2 transmits, to a frequency shifter 1, a luminance signal 24 whose level has been corrected. The frequency shifter 1 is a block for shifting, between adjacent tracks corresponding to the first field and the second field of one frame, the frequency of an FM luminance signal by ½ (hereinafter referred to as $f_H/2$) of a horizontal scanning frequency (hereinafter referred to as $f_H$). Further, the frequency of the FM luminance signal is shifted by $f_H/4$ between the adjacent tracks corresponding to the second field of one frame and the first field of the subsequent frame.

Figure 2:
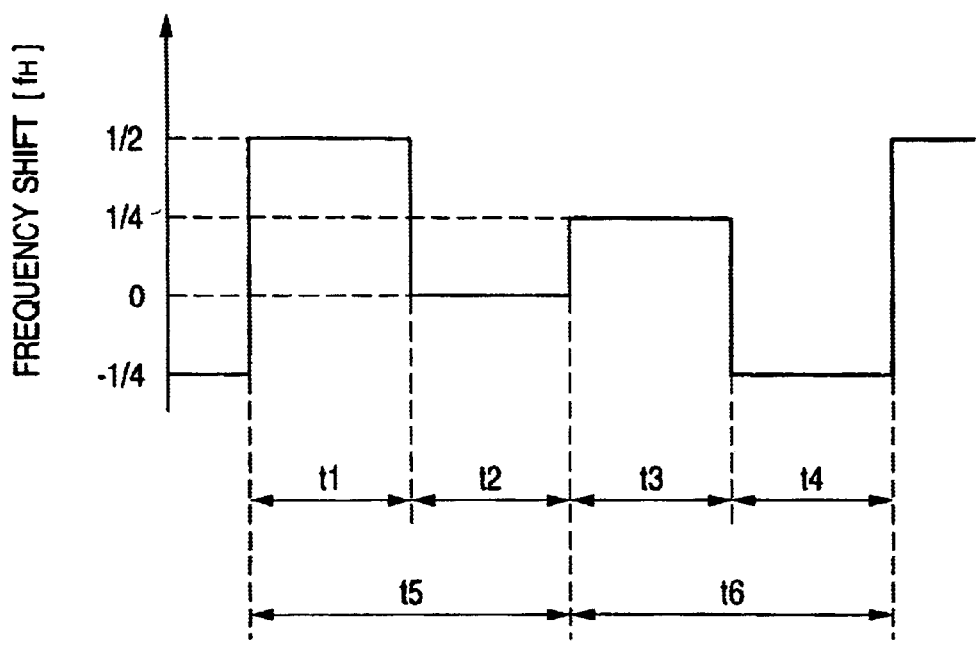
FIG. 2 is a diagram for explaining a frequency shift for an FM luminance signal according to the first embodiment.

More specifically, as is shown in FIG. 2, in the first one field interval t1, the frequency shifter 1 performs an $f_H/2$ shift in the frequency of an FM luminance signal in the positive direction, and in the succeeding one field interval t2, there is a 0 shift in the frequency of the FM luminance signal. Then, in the following one field interval t3, there is an $f_H/4$ shift in the frequency of the FM luminance signal in the positive direction, and at the next one field interval t4, there is an $f_H/2$ shift in the frequency of the FM luminance signal in the negative direction to obtain a $-f_H/4$ shifted frequency resultantly. To perform these shifts, the frequency shifter 1 includes a first shift voltage generator 11, a second shift voltage generator 12, a half-cycle frequency divider 12, and adders 14 and 15.

Specifically, the first shift voltage generator 11 is a block wherein a shifted voltage, which is to be superimposed on the video signal 24, is generated in accordance with the level of a head switching signal 21 that changes the connections of rotary heads 9a and 9b. The shifted voltage generated is consonant with an $f_H/2$ shift in the frequency of an FM luminance signal. The half-cycle frequency divider 13 outputs a signal having a frequency which is a half of the frequency of the inputted head switching signal 21 to the second shift voltage generator 12. The second shift voltage generator 12 is a block wherein a shifted voltage, which is to be superimposed on the luminance signal 24, is generated in accordance with the level of the frequency-divided signal received from the half-cycle frequency divider 13. The generated shifted voltage is consonant with an $f_H/4$ shift in the frequency of the FM luminance signal.

The adder 14 is a block for adding together the shifted voltage transmitted by the first shift voltage generator 11 and the shifted voltage transmitted by the second shift voltage generator 12, and the adder 15 is a block for adding together a voltage that is output by the adder 14 (a voltage for shifting the frequency of an FM luminance signal) and the luminance signal 24 that is transmitted by the pre-emphasis circuit 2. A luminance signal 25 to which the shifted voltage has been added is transmitted to a frequency modulator 3.

The frequency modulator 3 is a block for employing as a reference a frequency determined by a resistor and a capacitor in order to generate an FM luminance signal that is consonant with the luminance signal 25. The obtained FM luminance signal is then transmitted to a high-pass filter 4 that removes, from the FM luminance signal, a signal component that overlaps the frequency band of a low frequency converted chrominance. The characteristic of the high-pass filter 4 is such that, in order to enhance the resolution of an image, even a signal component in the vicinity of the frequency band of a low frequency converted chrominance can pass through without being attenuated. Thus, the value of the attenuation, relative to a signal component that overlaps the frequency band of the low frequency converted chrominance, is reduced.

The adder 15 is a block for adding together the low frequency converted chrominance 23 and an FM luminance signal from which the lowpass signal component has been removed by the high-pass filter 4. The video signal obtained by the addition is then transmitted to a recording equalizer 6. The recording equalizer 6, which is a block for correcting for the frequency properties of the rotary heads 9a and 9b, transmits to a recording amplifier 7 a video signal obtained by correction. The video signal amplified by the recording amplifier 7 is transmitted via a head selection switch 8 either to the rotary head 9a or to the rotary head 9b, and is recorded on magnetic tape (not shown).

Figure 3:
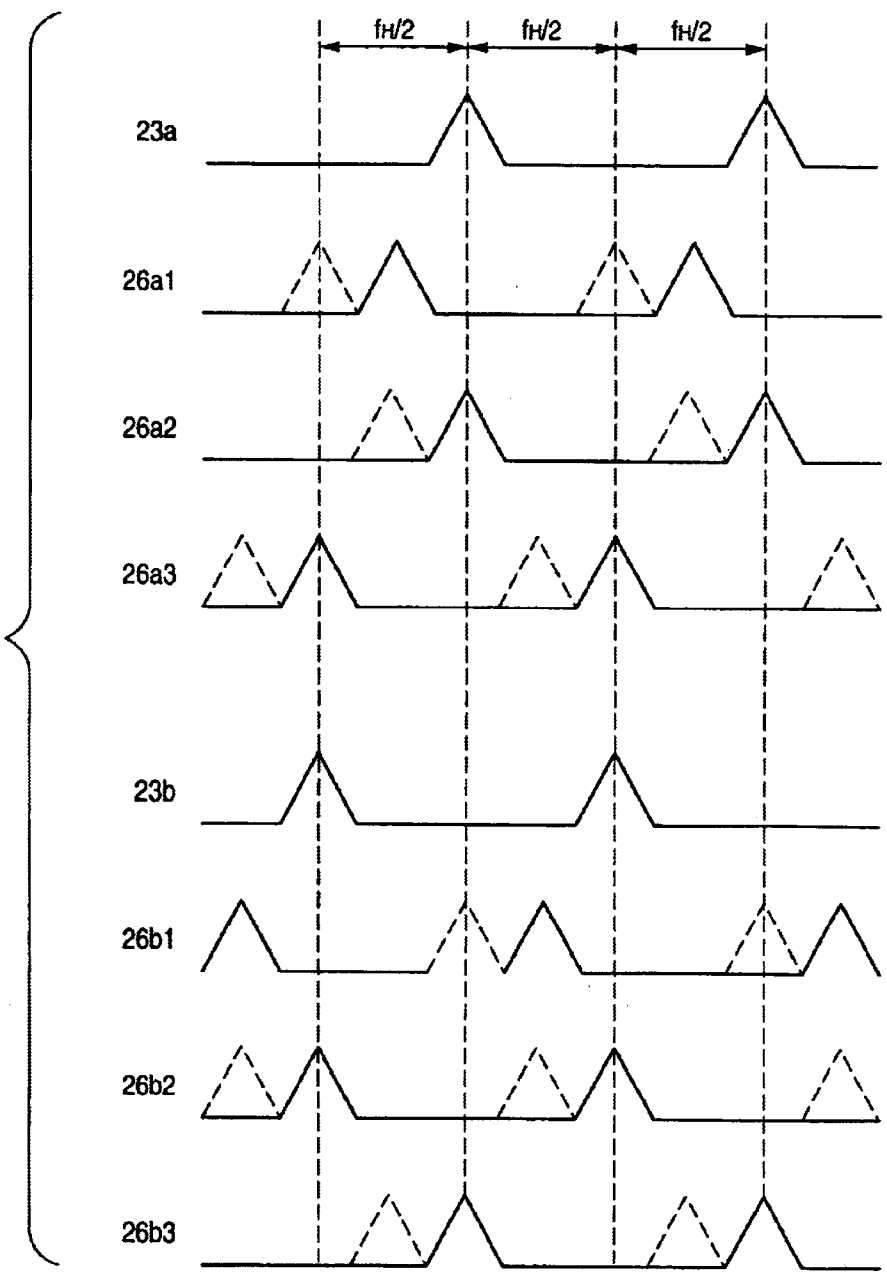
FIG. 3 is a diagram for explaining the relationship between the spectrum distribution for a low frequency converted chrominance and the spectrum distribution for an FM luminance signal according to the first embodiment.

FIG. 3 is a diagram for explaining the spectrum distribution of the low frequency converted chrominance and the spectrum distribution of the FM luminance signal 26. The operation performed for this embodiment will now be described while referring to FIG. 3, as needed.

When the spectrum of the low frequency converted chrominance 23 is distributed as is indicated by 23a in the first field intervals t1 and t3, in the second field intervals t2 and t4, after an $f_H/2$ shift, the spectrum of the low frequency converted chrominance 23 is distributed as is indicated by 23b.

Assume that, in the interval wherein there is an $f_H/2$ shift in the frequency of the FM luminance signal 26 in the positive direction, the spectrum of the FM luminance signal 26 is distributed as indicated by a solid line in 26a1. In other words, assume that an interleaving relationship is established between the low frequency converted chrominance 23a and the FM luminance signal 26a1. In this case, since in the interval t2 there is a 0 frequency shift, the spectrum of the FM luminance signal 26 is distributed as indicated by the solid line in 26b1. As a result, an interleaving relationship is established between the low frequency converted chrominance 23b and the FM luminance signal 26b1.

In the interval t3, there is an $f_H/4$ shift in the frequency of the FM luminance signal 26 in the positive direction (when the shift in the interval t3 is compared with the shift in the interval t1, wherein there is an $f_H/2$ shift in the spectrum in the positive direction, in interval t3 there is an $f_H/4$ shift in the FM luminance signal 26 in the negative direction). As a result, the spectrum in the interval t3 is distributed as indicated by the dashed line in 26a1, while between the low frequency converted chrominance 23a and the FM luminance signal 26a an interleaving relationship is established and the distribution distance for their spectra is $f_H/2$. Then, since in the interval t4 there is an $f_H/4$ shift in the frequency of the FM luminance signal 26 in the negative direction, the spectrum is distributed as indicated by the dashed line in 26b1, while between the low frequency converted chrominance 23b and the FM luminance signal 26b1 an interleaving relationship is established and the distribution distance for their spectra is $f_H/2$.

Assume that the oscillation frequency for the frequency modulator 3 fluctuates due to the change in the level of the luminance signal 22, and that the spectrum of the FM luminance signal 26 in the interval t1 is distributed as indicated by the solid line in 26b2. In this case, in the interval ti the spectral distributions for the low frequency converted chrominance 23a and the FM luminance signal 26a2 overlap each other, so that an interleaving relationship is not established. Thus, in the interval t2, the spectrum is distributed as is indicated by the solid line in 26b2, and therefore, the spectral distributions of the low frequency converted chrominance 23b and the FM luminance signal 26b2 overlap each other and an interleaving relationship is not established.

In the interval t3, the spectrum of the FM luminance signal is distributed as indicated by the dashed line in 26a2. As a result, between the low frequency converted chrominance 23a and the FM luminance signal 26a2 an interleaving relationship is established, and for their spectra the distribution distance is $f_H/4$. Further, in the interval t4, the spectrum is distributed as indicated by the dashed line in 26a2. Therefore, between the low frequency converted chrominance 23b and the FM luminance signal 26b2 an interleaving relationship is established, and the distribution distance for their spectra is $f_H/4$.

That is, when, due to a change in the oscillation frequency of the frequency modulator 3, the spectrum of the FM luminance signal 26 is distributed in the interval t1, as is indicated by the solid line 26a2, an interleaving relationship is not established in the interval t5, but instead is established in the interval t6. In other words, even when in the intervals t1 and t2 the spectrum of the low frequency converted chrominance 23 overlaps the spectrum of the FM luminance signal 26, in the intervals t3 and t4 an interleaving relationship is established.

Also, since the oscillation frequency for the frequency modulator 3 has been changed, assume that the spectrum for the FM luminance signal 26 in the interval t1 is distributed as is indicated by the solid line in 26a3. In this case, in the interval t1 an interleaving relationship is established between the low frequency converted chrominance 23a and the FM luminance signal 26a3, and the distribution distance for their spectra is $f_H/2$. In addition, since the spectrum in the interval t2 is distributed as indicated by the solid line in 26b3, between the low frequency converted chrominance 23b and the FM luminance signal 26b3 an interleaving relationship is established, and the distribution distance for their spectra is $f_H/2$.

In the interval t3, the spectrum for the FM luminance signal 26 is distributed as indicated by the dashed line in 26a3, and therefore, between the low frequency converted chrominance 23a and the FM luminance signal 26a3 an interleaving relationship is established, and the distribution distance for their spectra is $f_H/4$. And since the spectrum in the interval t4 is distributed as indicated by the dashed line in 26b3, between the low frequency converted chrominance 23b and the FM luminance signal 26b2 an interleaving relationship is established and the distribution distance for their spectra is $f_H/4$.

Specifically, when, due to a change in the oscillation frequency of the frequency modulator 3, the spectrum of the FM luminance signal in the interval t1 is distributed as indicated by the solid line in 26a3, an interleaving relationship is established for the intervals t5 and t6.

In conclusion, regardless of how the oscillation frequency of the frequency modulator 3 is changed, an interleaving relationship is established in at least one of two sequential frames. In the arrangement (the related arrangement) wherein an $f_H/4$ shift is not performed, the interleaving relationship cannot be established in a case where the spectrum of the FM luminance signal 26 in the interval t1 is distributed as indicated in 26a2. Therefore, when a worst case wherein an $f_H/4$ shift is performed is compared with a worst case in the related art, it is found that the adverse affect of the FM luminance signal 26 on the low frequency converted chrominance 23 is reduced by half.

While the first embodiment is employed for a recording performed in the extended time mode, it can also be employed for a recording performed in the standard mode.

An explanation will now be given for the electrical arrangement of a magnetic tape recording apparatus according to a second embodiment of the invention. The only difference between the first and the second embodiments is in the structure of the frequency shifter. Therefore, for the second embodiment only the structure of the frequency shifter will be described.

Figure 4:
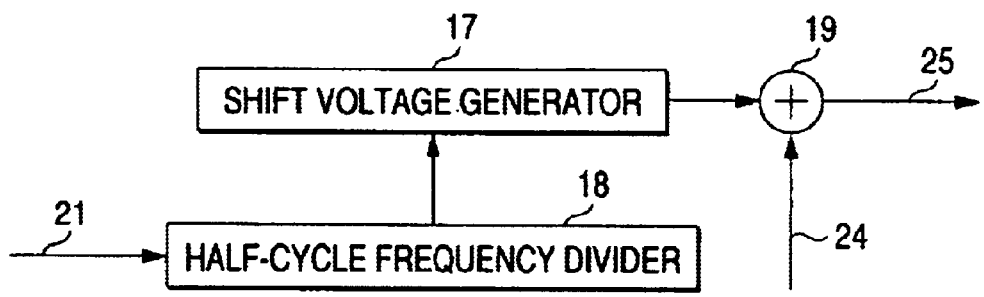
FIG. 4 is a block diagram illustrating the electrical arrangement of a frequency shifting unit in a magnetic tape recording apparatus according to a second embodiment of the invention.
Figure 5:
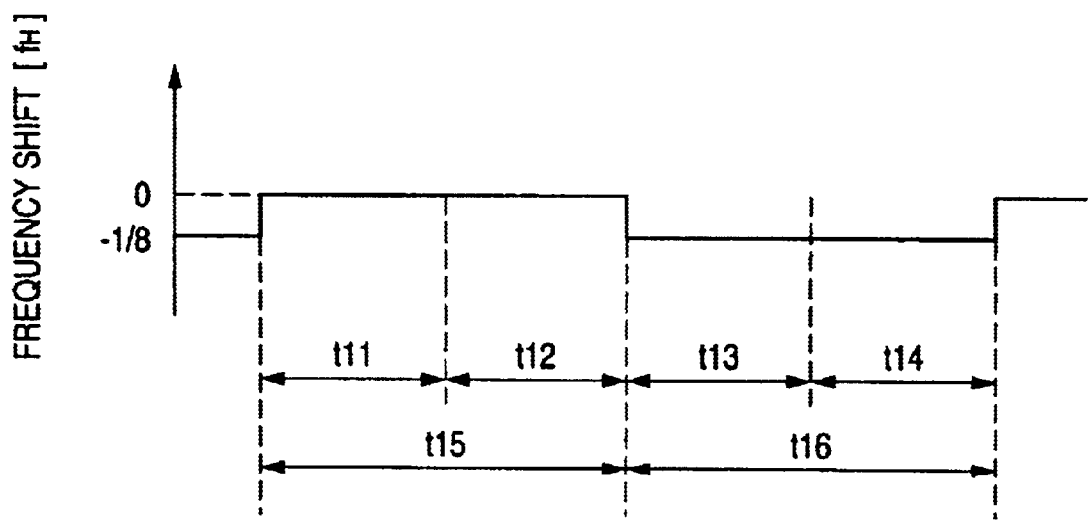
FIG. 5 is a diagram for explaining a frequency shift for an FM luminance signal according to the second embodiment.

As is shown in FIG. 4, in the second embodiment the frequency shifter is a block whereby an $f_H/8$ shift in the frequency of an FM luminance signal is performed between two sequential frames to be recorded. That is, as is shown in FIG. 5, in the first one frame interval t15 the frequency shifter does not shift the frequency of the FM luminance signal. In the following one frame interval t16, however, there is an $f_H/8$ shift in the frequency of the FM luminance signal in the negative direction. To perform this shifting, the frequency shifter includes a shift voltage generator 17, a half-cycle frequency divider 18 and an adder 19.

Specifically, the half-cycle frequency divider 18 is a block for outputting a signal having a frequency which is a half of a frequency of an inputted head selection signal 21 to the shift voltage generator 17. The shift voltage generator 17 is a block whereby a shifted voltage that is to be superimposed on a luminance signal 24 is generated in accordance with the level of the frequency-divided signal received from the half-cycle frequency divider 18. The shifted voltage generated is consonant with and $f_H/8$ shift of the frequency of the FM luminance signal. The adder 19 is a block for adding the shifted voltage, which is received from the shift voltage generator 17, to the luminance signal 24, which is transmitted by the pre-emphasis circuit 2. Subsequently, a luminance signal 25 to which the shifted voltage has been added is transmitted to the frequency modulator 3.

Figure 6:
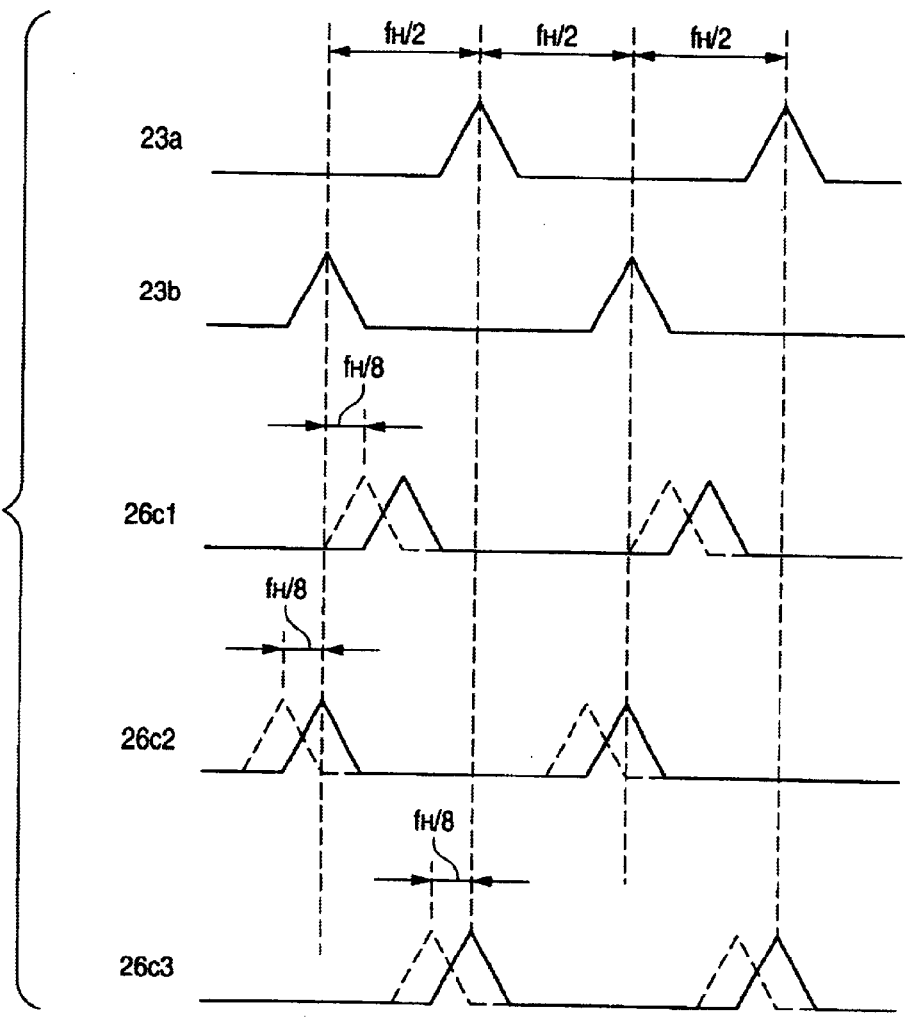
FIG. 6 is a diagram for explaining the spectrum distribution for a low frequency converted chrominance and the spectrum distribution for an FM luminance signal according to the second embodiment.

FIG. 6 is a diagram for explaining the spectrum distribution of the low frequency converted chrominance 23 and the spectrum distribution of the FM luminance signal 26. The operation of the second embodiment will now be described while referring to FIG. 6, as needed.

When, in the first field intervals t11 and t13, the spectrum of the low frequency converted chrominance 23 is distributed as indicated in 23a, in the second field intervals t12 and t14, an $f_H/2$ shift of the spectrum of the low frequency converted chrominance 23 is performed.

Assume that, in the interval t15, wherein the frequency of the FM luminance signal 26 is not shifted, the spectrum of the FM luminance signal 26 is distributed as is indicated by the solid line in 26c1. In this case, in the intervals t11 and t12, an interleaving relationship is established between the low frequency converted chrominances 23a and 23b and the FM luminance signal 26c1, and a distribution distance of $f_H/4$ is set for the relevant spectra.

In the interval t16, there is an $f_H/8$ shift in the frequency of the FM luminance signal 26 in the negative direction. Accordingly, the spectrum is distributed as is indicated by the dashed line 26c1. Therefore, in the interval t13, an interleave relationship is established between the low frequency converted chrominance 23a and the FM luminance signal 26c1, and the distribution distance for the relevant spectra is $3f_H/8$. Then, in the interval t14, an interleave relationship is established between the low frequency converted chrominance 23b and the FM luminance signal 26c1, and the distribution distance for the relevant spectra is $f_H/8$. That is, in the intervals t11 to t14, a constant interleaving relationship is established between the low frequency converted chrominance 23 and the FM luminance signal 26.

Again, assume that since the frequency is changed for which oscillation modulation is supplied by the frequency modulator 3, the spectrum of the FM luminance signal 26 in the interval t15 is distributed as indicated by the solid line in 26c2. In this case, in the interval t11 an interleaving relationship is established between the low frequency converted chrominance 23a and the FM luminance signal 26c2, and the distribution distance for the relevant spectra is $f_H/2$. In the interval t12, however, the spectra of the low frequency converted chrominance 23b and the FM luminance signal 26c2 overlap each other, so that an interleaving relationship is not established.

Since in the interval t16 there is an $f_H/8$ shift in the frequency of the FM luminance signal 26 in the negative direction, the spectrum of the FM luminance signal 26 is distributed as indicated by the dashed line in 26c2. In this case, in the interval t13, an interleaving relationship is established between the low frequency converted chrominance 23a and the FM luminance signal 26c2, and the distribution distance for the relevant spectra is $3f_H/8$. And in the interval t14, an interleaving relationship is established between the low frequency converted chrominance 23b and the FM luminance signal 26c2, and the distribution distance for the relevant spectra is $f_H/8$.

Specifically, and when the spectrum for a frequency shift of 0 is distributed as indicated by the solid line in 26c2, the spectra distributions in the interval t12 differ from those in the intervals t11, t13 and t14, wherein interleaving relationships are established for the spectra of the two signals. That is, even when a field wherein two spectra overlap is present in one of the sequential frames, in the other frame interleaving relationships are established in both fields.

In addition, assume that since the frequency is changed for which oscillation modulation is supplied by the frequency modulator 3, the spectrum of the FM luminance signal 26 in the interval t15 is distributed as is indicated by the solid line in 26c3. In this case, in the interval t11 the spectra of the low frequency converted chrominance 23a and the FM luminance signal 26c3 overlap each other, and an interleaving relationship is not established. While in the interval t12, an interleaving relationship is established between the low frequency converted chrominance 23b and the FM luminance signal 26c3, and the distribution distance for the relevant spectra is $f_H/2$.

In the interval t16, since there is an $f_H/8$ shift in the frequency of the FM luminance signal 26 in the negative direction, the spectrum of the FM luminance signal 26 is distributed as indicated by the dashed line in 26c3. In this case, in the interval t13 an interleaving relationship is established between the low frequency converted chrominance 23a and the FM luminance signal 26c3, an the distribution distance for the relevant spectra is $f_H/8$. While in the interval t14, an interleaving relationship is established between the low frequency converted chrominance 23b and the FM luminance signal 26c2, and the distribution distance for the relevant spectra is $3f_H/8$.

That is, when the frequency is changed for which oscillation modulation is supplied by the frequency modulator 3, and when the spectrum for a frequency shift of 0 is distributed as indicated by the solid line in 26c3, in the interval t11 the relevant spectra overlap each other. Furthermore, in the intervals t12 to t14, interleaving relationships are established. In other words, even when a field wherein spectra overlap is present in one of the sequential frames, in the other frame interleaving relationship are established in both fields.

In conclusion, regardless of the value of a frequency for which oscillation modulation is supplied by the frequency modulator 3, in at least one of two sequential frames, interleaving relationships are established for its two fields. In a structure (a related structure) wherein an $f_H/8$ shift is not performed, when the spectrum of the FM luminance signal in the interval t15 is distributed as indicated by 26c2 or 26c3, spectra overlap each other in one of the fields in each frame. Therefore, when the worst case for a structure wherein an $f_H/8$ shift is performed is compared with the worst case for the related art wherein an $f_H/8$ shift is not performed, it is found the adverse affect of the FM luminance signal 26 on the low frequency converted chrominance 23 is reduced.

The invention is not limited to the above described embodiments, which will now be briefly reviewed. Thus, so that the frequency shifting operation in the first embodiment can be clearly understood, when one of two sequential frames are recorded (interval t6), compared with when the other frame (interval t5) is recorded there is an $f_H/4$ shift in the frequency of the FM luminance signal in the negative direction. However, the shift distance may, for example, be $+f_H/4$ in the interval t5 and 0 in the interval t6 (in this case, the distance for the shift will be $3 \times f_H/4$ in the interval t1, $f_H/4$ in the interval t2, $f_H/2$ in the interval t3, and 0 in the interval t4). That is, arbitrary distances for shifts can be employed so as to satisfy the condition wherein the frequency difference is $f_H/2$ for adjacent tracks in the same frame, and is $f_H/4$ between the second field of the previous frame and the first field of the subsequent frame.

And, so that the frequency shifting operation in the second embodiment can be clearly understood, when one of two sequential frames are recorded (interval t16), compared with when the other frame is recorded (interval t15) there is an $f_H/8$ shift in the frequency of the FM luminance signal in the negative direction. However, the shift distance may be, for example, $f_H/8$ in the interval t15 and 0 in the interval t16. That is, arbitrary shift distances can be employed so as to satisfy the condition wherein the frequency difference is $f_H/8$ for adjacent frames.

In addition, in the embodiments a magnetic tape recording apparatus for recording an NTSC video signal has been employed. However, these embodiments can be applied for a magnetic tape recording apparatus that records a PAL video signal.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A magnetic tape recording apparatus for recording an FM luminance signal and a low frequency converted chrominance onto tracks of a magnetic tape, wherein both of a frequency of the FM luminance signal and a spectrum distribution of the low frequency converted chrominance are shifted by $f_H/2$ between two of the tracks corresponding to the first field and the second field of one frame of a recorded image when a horizontal scanning frequency is presumed as $f_H$, the magnetic tape recording apparatus comprising:

a frequency shifter for shifting the frequency of the FM luminance signal by $f_H/4$ between two of the tracks corresponding to the second field of one frame and the first field of the subsequent frame.

2. The magnetic tape recording apparatus as set forth in claim 1, wherein the frequency shifter includes a frequency divider for frequency half-dividing a frequency of a head switching signal for changing connection between rotary heads, and wherein the frequency shift of the FM luminance signal is conducted by use of the frequency-divided signal of the head switching signal.

3. A magnetic tape recording apparatus for recording an FM luminance signal and a low frequency converted chrominance onto tracks of a magnetic tape, wherein a spectrum distribution of the low frequency converted chrominance is shifted by $f_H/2$ between two of the tracks corresponding to the first field and the second field of one frame of a recorded image when a horizontal scanning frequency is presumed as $f_H$, the magnetic tape recording apparatus comprising:

a frequency shifter for shifting the frequency of the FM luminance signal by $f_H/8$ between two of the tracks corresponding to the second field of one frame and the first field of the subsequent frame.

4. The magnetic tape recording apparatus as set forth in claim 3, wherein the frequency shifter includes a frequency divider for frequency half-dividing a frequency of a head switching signal for changing connection between rotary heads, and wherein the frequency shift of the FM luminance signal is conducted by use of the frequency-divided signal of the head switching signal.

5. A method of recording an FM luminance signal and a low frequency converted chrominance onto tracks of a magnetic tape, comprising the steps of:

shifting both of a frequency of the FM luminance signal and a spectrum distribution of the low frequency converted chrominance by $f_H/2$ between two of the tracks corresponding to the first field and the second field of one frame of a recorded image when a horizontal scanning frequency is presumed as $f_H$, and shifting the frequency of the FM luminance signal by $f_H/4$ between two of the tracks corresponding to the second field of one frame and the first field of the subsequent frame.

6. The recording method as set forth in claim 5, wherein the frequency shift of the FM luminance signal is conducted by use of a frequency half-divided signal of a head switching signal for changing connection between rotary heads.

7. A method of recording an FM luminance signal and a low frequency converted chrominance onto tracks of a magnetic tape, comprising the steps of:

shifting a spectrum distribution of the low frequency converted chrominance by $f_H/2$ between two of the tracks corresponding to the first field and the second field of one frame of a recorded image when a horizontal scanning frequency is presumed as $f_H$, and shifting a frequency of the FM luminance signal by $f_H/8$ between two of the tracks corresponding to the second field of one frame and the first field of the subsequent frame.

8. The recording method as set forth in claim 7, wherein the frequency shift of the FM luminance signal is conducted by use of a frequency half-divided signal of a head switching signal for changing connection between rotary heads.

* * * * *